United States Patent [19]

Magnet

[11] Patent Number: 4,583,498
[45] Date of Patent: Apr. 22, 1986

[54] METHOD OF CHANGING THE DIRECTION OF ROTATION OF AN INTERNAL COMBUSTION ENGINE, AND AN ENGINE APPLYING THE METHOD

[75] Inventor: Jean-Louis Magnet, St-Germain en Laye, France

[73] Assignee: Societe d'Etudes de Machines Thermiques S.E.M.T., S.A., Saint-Denis, France

[21] Appl. No.: 724,173

[22] Filed: Apr. 17, 1985

[30] Foreign Application Priority Data

Apr. 18, 1984 [FR] France .................. 84 06126

[51] Int. Cl.⁴ .................................. F01L 13/02
[52] U.S. Cl. ........................ 123/41 R; 123/90.15; 123/90.18
[58] Field of Search .............. 123/41 R, 90.15, 90.16, 123/90.17, 90.18, 90.2, 90.21

[56] References Cited

U.S. PATENT DOCUMENTS

| | | | |
|---|---|---|---|
| 1,108,249 | 8/1914 | Schoonmaker | 123/41 R |
| 1,272,018 | 7/1918 | Dietze | 123/41 R |
| 1,352,758 | 9/1920 | McKechnie | 123/41 R |
| 1,480,979 | 1/1924 | Banner | 123/41 R |
| 1,556,410 | 10/1925 | Boyer | 123/90.18 |
| 1,651,402 | 12/1927 | Midgley | 123/90.18 |
| 2,151,832 | 3/1939 | Bugatti | 74/569 |
| 2,197,282 | 4/1940 | Walker | 123/90.16 |
| 2,663,288 | 12/1953 | Hutchison | 123/90.16 |

FOREIGN PATENT DOCUMENTS

| | | |
|---|---|---|
| 571022 | 4/1930 | Fed. Rep. of Germany . |
| 750862 | 1/1945 | Fed. Rep. of Germany . |
| 864779 | 1/1953 | Fed. Rep. of Germany . |
| 382292 | 2/1908 | France . |
| 890624 | 2/1944 | France . |
| 1427090 | 6/1966 | France . |
| 14591 | of 1912 | United Kingdom . |

Primary Examiner—Ira S. Lazarus
Attorney, Agent, or Firm—Kenyon & Kenyon

[57] ABSTRACT

A method of changing the direction of rotation of an internal combustion engine, and in particular of a marine engine, in which the camshafts (15) include two cams (16, 17) for each tappet (20) of a controlled member, each of said cams being suitable for use in one direction of rotation, the direction of rotation of the engine being changed by shifting said camshafts in translation, wherein, prior to shifting said camshafts, the tappets are rotated through one-fourth of a turn so as to put the axis of rotation of each tappet cam-follower wheel (10) orthogonal to the direction of camshaft translation. The invention also applies to an engine employing the method.

5 Claims, 3 Drawing Figures

METHOD OF CHANGING THE DIRECTION OF ROTATION OF AN INTERNAL COMBUSTION ENGINE, AND AN ENGINE APPLYING THE METHOD

The present invention relates to changing the direction of rotation of an internal combustion engine.

BACKGROUND OF THE INVENTION

Large internal combustion engines, and in particular marine engines, are generally reversible since the torque to be transmitted is too large for it to be possible to use rotation reversing means of reasonable bulk and simple construction.

In known manner, the camshafts of these engines are provided with additional cams to modify the instants at which the admission and exhaust valves open, and also to modify the instants at which fuel is injected into the cylinders.

Each camshaft thus includes two cams per controlled member, one being for one direction of rotation and the other, which is angularly symmetrical to the first about a dead point of the crankshaft, being for the opposite direction of rotation.

The direction of rotation is changed by shifting the camshafts in translation when the engine is stopped. To pass from one cam to the other, the tappet cam-follower wheels slide over the cams without rotating, thus giving rise to considerable wear of the rolling paths on the wheels and on the cams.

The aim of the present invention is to avoid wear on the rolling paths and on the connections slopes of the cams by replacing said sliding without rolling by rolling without sliding. The force required to shift the camshaft is thus considerably reduced.

SUMMARY OF THE INVENTION

The present invention provides a method of changing the direction of rotation of an internal combustion engine, and in particular of a marine engine, in which the camshafts include two cams for each tappet of a controlled member, which cams are interconnected by a connection surface, with each cam being for use in one direction of rotation only, the direction of rotation of the motor being changed by shifting said camshafts in translation, wherein, prior to shifting said camshafts, the tappets are rotated through one-fourth of a turn so as to make the axis of rotation of the cam follower wheel of each tappet orthogonal to the translation direction of the camshafts.

Preferably, prior to rotating the tappets, the return springs of the valves are unloaded, and advantageously the springs are unloaded by at least one-half of the value of their intial loading.

Preferably, the camshafts can be shifted only after the tappets have been rotated and the valve return springs have been unloaded.

The present invention also provides an engine implementing this method, and a preferred embodiment of this engine includes at least one toothed rack and each tappet includes a toothed sector meshing therewith. Naturally, engines which apply the method may alternatively use any other suitable mechanical means for rotating the tappets.

BRIEF DESCRIPTION OF THE DRAWINGS

A preferred embodiment of an internal combustion engine implementing the method of the invention is described below by way of example with reference to the accompanying drawings, in which.

DESCRIPTION OF PREFERRED EMBODIMENT

Figure 1:
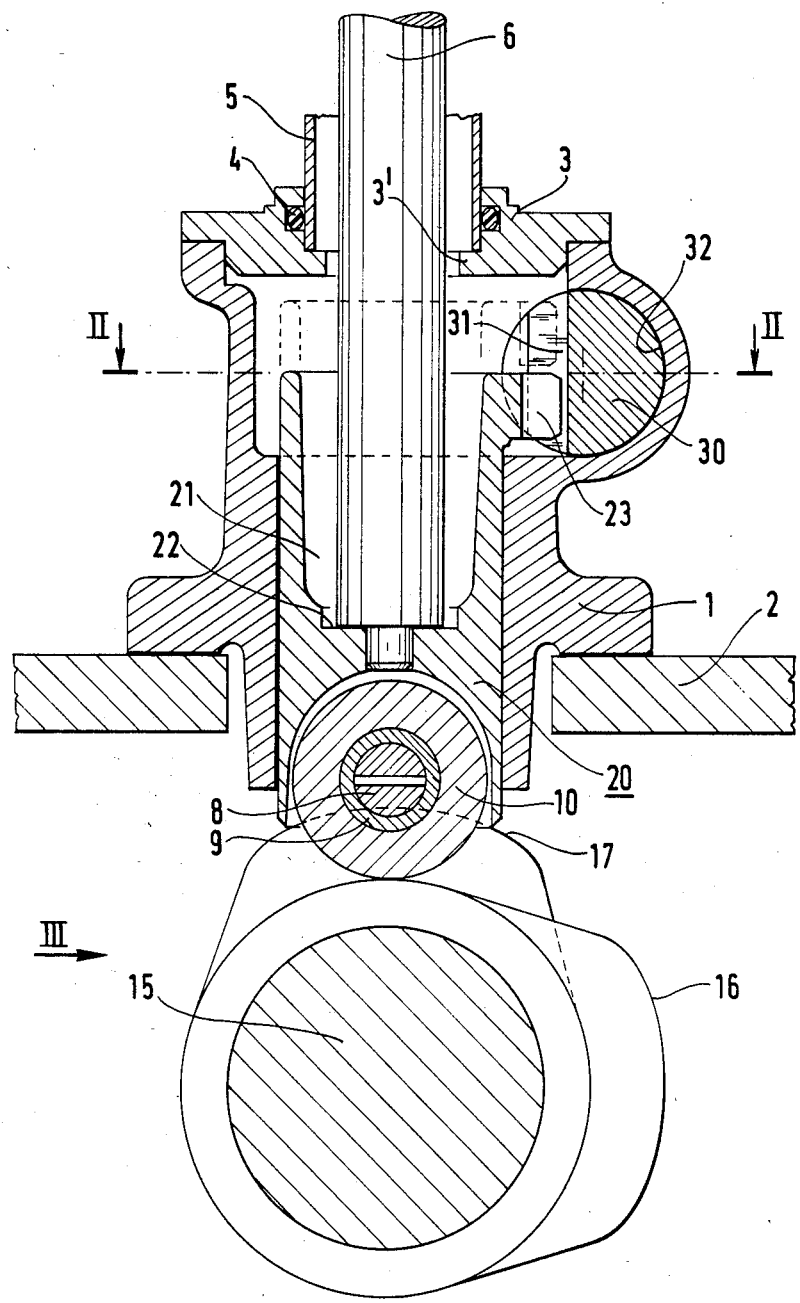
FIG. 1 is a section through a tappet and two cams associated therewith for use in respective opposite directions of rotation.

FIG. 1 shows a tappet guide 1 which is fixed by known means (not shown) to a part 2 which is integral with the engine. The guide 1 is closed by a cover 3 fitted with a sealing ring 4. A cylinder 5 abutting against a shoulder 3' on the cover 3 protects a pushrod 6.

Figure 2:
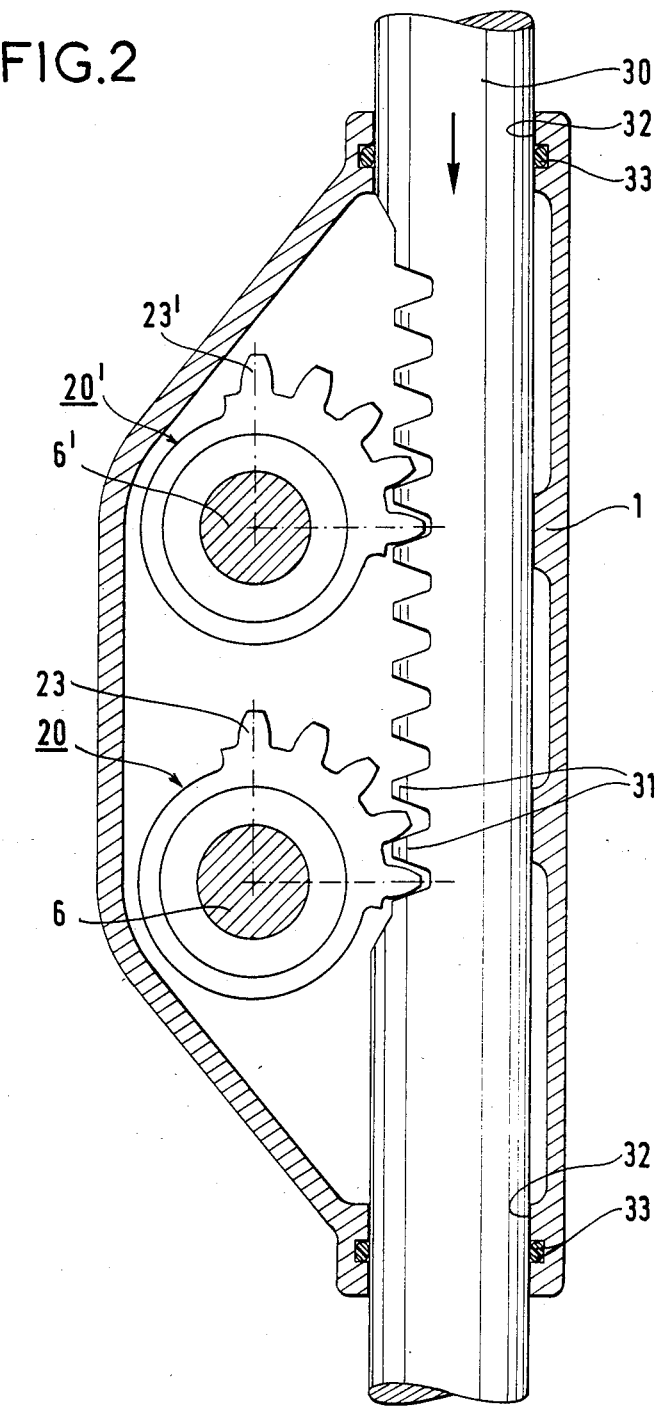
FIG. 2 is a section on line II of FIG. 1 showing two tappets belonging to the same cyinder.

In this figure, the tappet-guide 1 is shown containing only one tappet 20 out of the two tappets which a tappet-guide generally contains (one for the exhaust and the other for admission), the second tappet 20' is visible in FIG. 2. The tappet 20 cmprises a shaft 8 on which there rotates a wheel 10 provided with a bearing 9, and a housing 21 provided with a shoulder 22 against which the pushrod 6 bears.

The tappet 20 also includes straight teeth 23 which mesh with straight teeth 31 on a rack 30, these two sets of teeth being cut parallel to the direction of tappet displacement so as to enable the tappet to move freely in the tappet-guide 1. The tappet wheel 10 bears against a cam 16 on a camshaft 15 which further includes a cam 17, with the cams 16 and 17 each being provided for one direction of rotation and being consequently at different angles. The wheel 10 is constantly urged against one or other of the cams by means of a return spring (not shown since it is usually fitted level with the valves).

FIG. 2 shows both tappets 20 and 20' of a tappet guide 1. These two tappets are the admission and exhaust tappets of a single cylinder. The rack 30 is guided in bores 32 through the tappet guide 1 and each bore includes a sealing ring 33. The rack is driven and prevented from rotating by a mechanism which is not shown, but which is known per se.

Each of the tappets 20 and 20' includes teeth 23, 23' which are formed over at least one-fourth of their circumferences, and the rack 30 includes teeth 31 which, when the rack is displaced linearly, rotate both tappets 20 and 20'. In order to rotate the tappets through one-fourth of a turn, the rack should be displaced by a suitable amount linearly.

Figure 3:
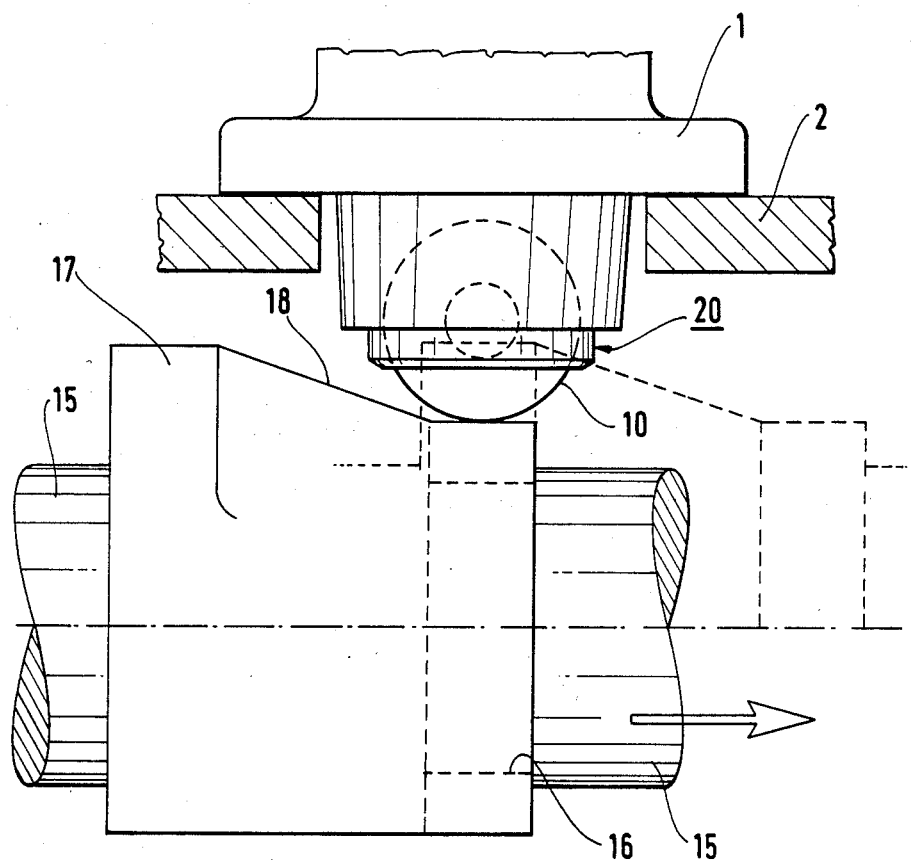
FIG. 3 is a section on line III of FIG. 1 showing the tappet after it has rotated through one-fourth of a turn.

FIG. 3 is a section of line III of FIG. 1, and shows the tappet 20 after it has rotated through one-fourth of a turn in the tappet-guide 1. The wheel 10 is still urged against the cam 16, but its axis of rotation is orthogonal to the direction in which the camshaft is shifted. When the camshaft 15 is shifted by any suitable known means, the wheel rolls in succession over the cam 16, over an intermediate portion 18, and over the other cam 17. Once the camshaft has reached its end stop, the wheel is urged against the cam 17 and it is then possible to rotate the tappet in the opposite direction through one-fourth of a turn to return it to its initial position which is its working position in normal operation. The direction of rotation of an engine is thus reversed in the following manner:

fuel injection is stopped, and once the motor has come to rest;

the return springs of the controlled members are optionally unloaded;

the tappets of the motor are turned through one-fourth of a turn by suitable longitudinal displacement of a rack 30;

the camshafts 15 are shifted in translation to move each cam-follower wheel from the cams 16 to the cams 17;

the tappets are again turned through one-fourth of a turn, but this time in the opposite direction to return them to their initial position;

if they were previously unloaded, the return springs are now reloaded;

the engine is started using compressed air, but in the opposite direction of rotation; and fuel is injected.

Naturally, the above sequence of operations may be automated, with each operation of the sequence requiring the preceding operation to be performed before it can itself be performed.

I claim:

1. A method of changing the direction of rotation of an internal combustion engine, and in particular of a marine engine, in which the camshafts include two cams for each tappet of a controlled member, each of said cams being suitable for use in one direction of rotation, the direction of rotation of the engine being changed by shifting said camshafts in translation, wherein, prior to shifting said camshafts, the tappets are rotated through one-fourth of a turn so as to put the axis of rotation of each tappet cam-follower wheel orthogonal to the direction of camshaft translation.

2. A method according to claim 1, wherein, prior to rotating the tappets, the return springs of the valves are unloaded.

3. A method according to claim 2, wherein the return springs are unloaded by an amount equal to at least one-half of their initial loading.

4. A method according to claim 1, wherein the operation of moving the camshafts in translation requires the tappets to have previously been rotated through one-fourth of a turn.

5. An engine applying the method according to claim 1, and including at least one rack fitted with teeth, and wherein each tappet includes a toothed sector meshing with the teeth of said rack.

* * * * *